(12) United States Patent
Bogazzi

(10) Patent No.: US 11,445,847 B2
(45) Date of Patent: *Sep. 20, 2022

(54) RETAINING CLIP FOR LID OR BASE OF COOKING DEVICE

(71) Applicant: The Big Green Egg, Inc., Atlanta, GA (US)

(72) Inventor: Marco Bogazzi, Kennesaw, GA (US)

(73) Assignee: The Big Green Egg, Inc., Atlanta, GA (US)

( * ) Notice: Subject to any disclaimer, the term of this patent is extended or adjusted under 35 U.S.C. 154(b) by 423 days.

This patent is subject to a terminal disclaimer.

(21) Appl. No.: 15/539,762

(22) PCT Filed: Dec. 28, 2015

(86) PCT No.: PCT/US2015/067709
§ 371 (c)(1),
(2) Date: Jun. 26, 2017

(87) PCT Pub. No.: WO2016/106419
PCT Pub. Date: Jun. 30, 2016

(65) Prior Publication Data
US 2017/0360238 A1    Dec. 21, 2017

Related U.S. Application Data

(60) Provisional application No. 62/096,992, filed on Dec. 26, 2014.

(51) Int. Cl.
*A47J 27/08* (2006.01)
*F24B 1/20* (2006.01)
(Continued)

(52) U.S. Cl.
CPC .......... *A47J 27/0813* (2013.01); *A47J 37/07* (2013.01); *F24B 1/207* (2013.01); *F24B 1/24* (2013.01)

(58) Field of Classification Search
CPC .... A47J 37/0704; A47J 36/34; A47J 37/0763; A47J 36/06; A47J 36/12; A47J 36/36;
(Continued)

(56) References Cited

U.S. PATENT DOCUMENTS 466,648 A * 1/1892 Young .................. E05C 19/003
                                                           292/259 R
2,491,144 A * 12/1949 Yankovitch ........... A47J 27/092
                                                           220/301

(Continued)

OTHER PUBLICATIONS

Komodo Kamado Rafractory Cooker, Datasheet [online], YouTube, 2011 [retrtieved on Feb. 25, 2016] Retrieved from http://www.nakedwhiz.com/productreviews/komodokamado/kk.htm.
(Continued)

*Primary Examiner* — Tu B Hoang
*Assistant Examiner* — Vy T Nguyen
(74) *Attorney, Agent, or Firm* — Merchant & Gould P.C.

(57) ABSTRACT

A retaining clip for a Kamado-style or other cooking device that limits movement of the device's lid or base relative to a band extending around the lid or base. The retaining clip couples to the band and also has portions that engage a rim or ridge of the lid or base to resist movement of the band in a direction away from the rim or ridge. Multiple retaining clips may be positioned at various locations around the band.

15 Claims, 3 Drawing Sheets

(51) Int. Cl.
*F24B 1/24* (2006.01)
*A47J 37/07* (2006.01)

(58) Field of Classification Search
CPC ........ A47J 37/04; A47J 37/042; A47J 37/049; A47J 37/0635; A47J 37/0786; A45F 5/10
USPC ................ 99/421; 126/126, 25 R, 41 R, 9 R, 126/152 B, 194, 30, 304 R; 220/592.22, 220/774, 810
See application file for complete search history.

(56) References Cited

U.S. PATENT DOCUMENTS

| | | | |
|---|---|---|---|
| 3,611,915 A | 10/1971 | Glaser et al. | |
| 4,390,002 A | 6/1983 | Daily, III | |
| 4,721,037 A | 1/1988 | Blosnich | |
| 4,924,845 A | 5/1990 | Johnson et al. | |
| 5,111,802 A | 5/1992 | Lin | |
| 5,251,542 A * | 10/1993 | Itoh | A47J 36/10 206/545 |
| 5,442,998 A * | 8/1995 | Niese | A47J 27/0813 126/369 |
| 5,638,984 A * | 6/1997 | Munari | A47J 36/10 220/318 |
| 6,463,923 B2 | 10/2002 | Carley et al. | |
| 7,089,926 B2 | 8/2006 | Woller | |
| 2005/0211237 A1 * | 9/2005 | Woller | A47J 37/0763 126/25 R |
| 2009/0308373 A1 | 12/2009 | Scott et al. | |
| 2010/0213206 A1 * | 8/2010 | Greene | A47G 23/0216 220/752 |

OTHER PUBLICATIONS

International Search Report and Written Opinion for PCT/US2015/067709, dated Mar. 4, 2016.

* cited by examiner

RETAINING CLIP FOR LID OR BASE OF COOKING DEVICE

This application is being filed on 28 Dec. 2015, as a PCT International Patent application and claims the benefit of priority of U.S. Provisional patent application Ser. No. 62/096,992, filed Dec. 26, 2014, the entire disclosure of which is incorporated by reference in its entirety.

FIELD OF THE INVENTION

The present invention relates, generally, to the field of cooking devices such as cookers, smokers and grills for food preparation, and to, more particularly, apparatuses and methods for restricting movement of a lid or base of a cooking device.

BACKGROUND OF THE INVENTION

Many cooking devices for grilling or smoking food items have a lid that is connected to a base such that the lid may be moved relative to the base between open and closed positions. When the lid is in a closed position, the lid and base form a cavity in which food items typically reside atop a cooking grid during cooking. When the lid is in an open position, the cooking grid and food items present on the cooking grid are accessible from outside of the cooking device such as, for turning from one side to another or repositioning at a different location atop the cooking grid. When the lid is in a closed position, the cooking grid and food items are enclosed within the cooking device to provide maximum heating of the food items and cooking thereof.

In such cooking devices, the lid and base are typically connected by a hinge, pivot, or other mechanism that permits the lid to be movable relative to the base between open and closed positions. In certain Kamado-style cooking devices, the mechanism may be coupled to a band that extends at least partially about a portion of the lid. Similarly, the mechanism may be coupled to another band that extends at least partially about a portion of the base. Together, the bands secure the mechanism, respectively, to the lid and base. The bands reside adjacent respective protruding rims or ridges that extend around the lid and base, and between the rims or ridges and the edges of the lid and base that abut when the lid is in a closed position. The bands are generally pulled tight about the lid or base, as the case may be, during assembly of the cooking device. The protruding rims or ridges tend to limit relative movement between the lid or base and a respective band in a direction away from the corresponding edge of the lid or base. Due at least partially to the rims or ridges and due at least partially to the bands being pulled tight, there is generally very limited relative movement between a band and the respective lid or base during movement of the lid relative to the base.

Unfortunately, if the bands are not tightened sufficiently during assembly of the cooking device or become loose during use of the cooking device, the lid or base may slide or move relative to a respective band, thereby allowing the lid or base to separate from the respective band and mechanism. If such separation occurs and, particularly, if the lid or base is made from a ceramic material having substantial weight, the lid, base, and/or mechanism may uncontrollably move or even fall from the remainder of the cooking device and potentially injure a nearby person or property.

There is, therefore, a need in the industry for a device that aids in preventing relative sliding or movement between the lid or base of a cooking device and a band extending at least partially about the lid or base, and that solves these and other problems, deficiencies, and shortcomings of present cooking devices.

SUMMARY OF THE INVENTION

Broadly described, the present invention comprises an apparatus and method for limiting relative movement between a band extending at least partially about a lid or base of a cooking device and the respective lid or base. According to an example embodiment and without limitation, the apparatus comprises a retaining clip that limits relative movement between the lid or base of a cooking device and a band extending at least partially about the lid or base. The retaining clip is securable to a band at a desired location about the cooking device's lid or base, as the case may be. The retaining clip includes a band interface portion for residing substantially adjacent to and coupling to a band, a rim interface portion extending from the band interface portion for residing adjacent to a protruding rim or ridge of a cooking device's lid or base, and a hook portion extending at an angle from and relative to the rim interface portion for limiting movement of the band away from the rim or ridge and toward an edge of the lid or base, as the case may be. In accordance with the example embodiment and absent limitation, the method comprises using a protruding rim or ridge of a cooking device's lid or base to limit relative movement between a band and the lid or base in one direction, while engaging the rim or ridge with the retaining clip to limit relative movement between the band and lid or base in another direction.

Advantageously, the retaining clip limits and may even prevent relative movement, as the case may be, between a lid or base of a cooking device and a band extending at least partially around the lid or base and coupled to mechanism for opening or closing the lid relative to the base of the cooking device. More particularly, the retaining clip limits relative movement between a band and the lid or base, as the case may be, in which the band moves in a direction toward the lid's or base's edge. By limiting such relative movement, the retaining clip tends to prevent or at least lessen the possibility that the cooking device's lid or base may separate from the band and/or mechanism, and from the remainder of the cooking device.

Other uses, advantages and benefits of the present invention may become apparent upon reading and understanding the present specification when taken in conjunction with the appended drawings.

DETAILED DESCRIPTION OF THE DRAWINGS

Figure 1:
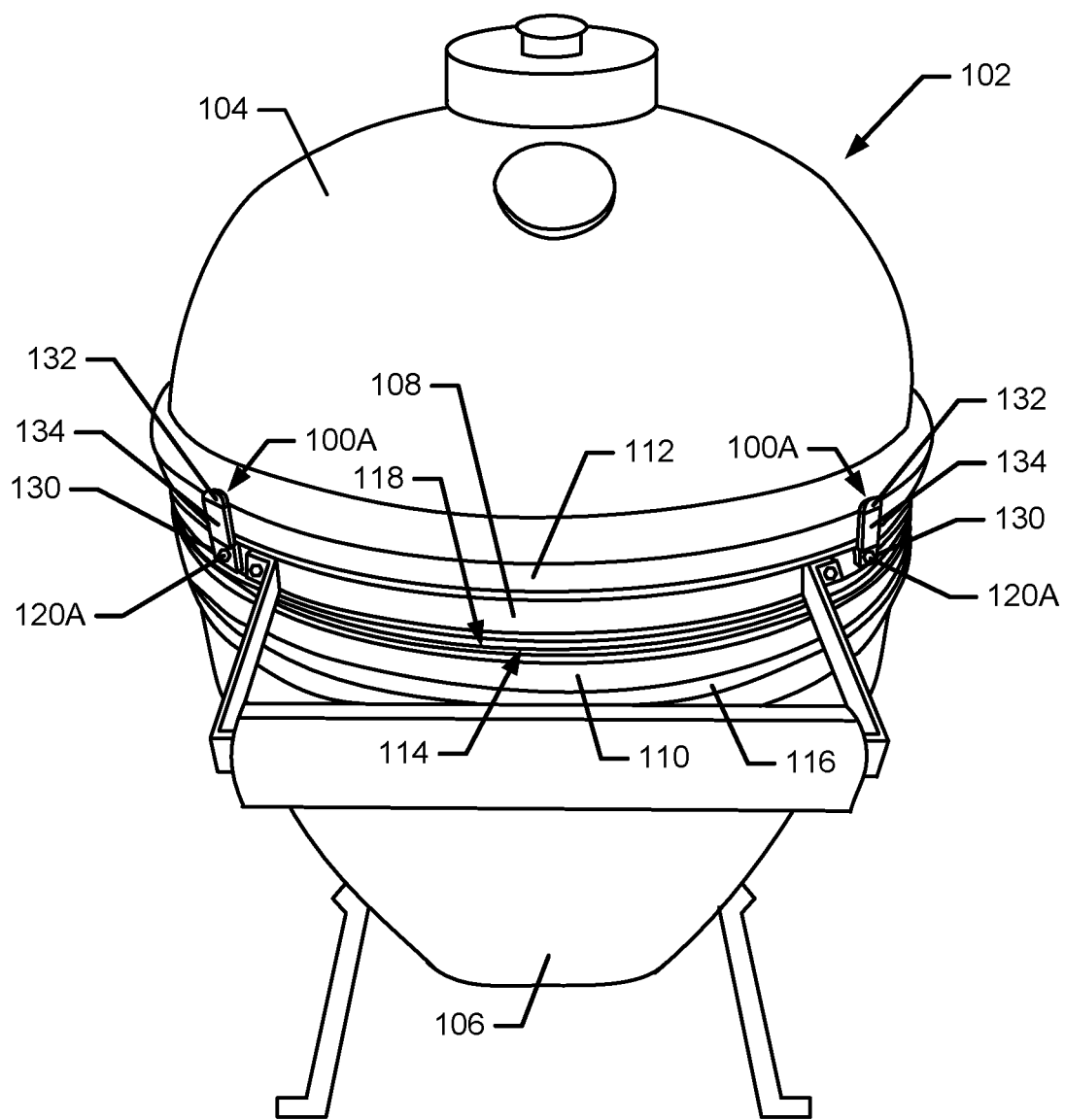
FIG. 1 displays a front, perspective view of a retaining clip for a lid or base of a cooking device in use restricting movement of a lid of a cooking device relative to a band extending at least partially about the lid of the cooking device, in accordance with an example embodiment of the present invention.

Referring now to the drawings in which like numerals represent like elements or steps throughout the several views, FIG. 1 displays a retaining clip 100 for the lid or base of a cooking device in use with a lid 104 of a Kamado-style cooking device 102, according to an example embodiment of the present invention. The retaining clip 100 aids in securing a lid 104 or base 106 of the cooking device 102 to respective bands 108, 110 of the cooking device 102 that extend substantially around the lid 104 and base 106 and to which a hinge assembly (also sometimes referred to herein as a "hinge mechanism" or "mechanism") attaches at a rear of the cooking device 102. By so securing the lid 104 or base 106, the possibility that the lid 104 or base 106 may move enough to come loose from a respective band 108, 110 or that a band 108, 110 may come move enough to come loose, respectively, from the lid 104 or base 106 during use of the cooking device 102 is reduced.

Figure 2:
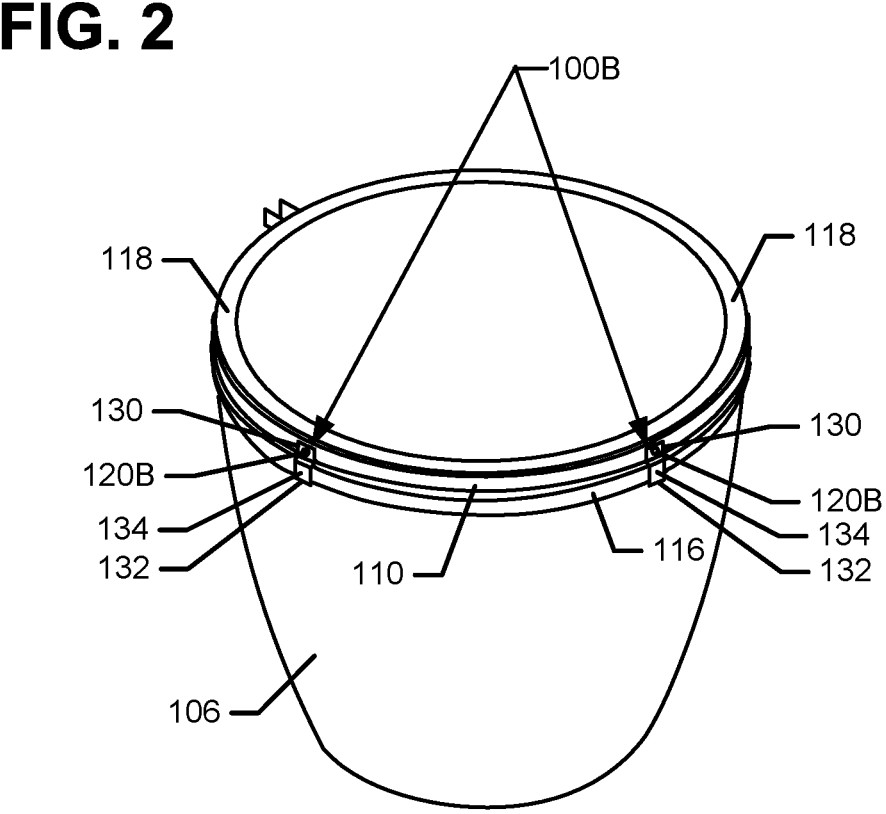
FIG. 2 displays a front, perspective view of a retaining clip for a lid or base of a cooking device in use restricting movement of a base of a cooking device relative to a band extending at least partially about the base of the cooking device, in accordance with the example embodiment of the present invention.
Figure 3:
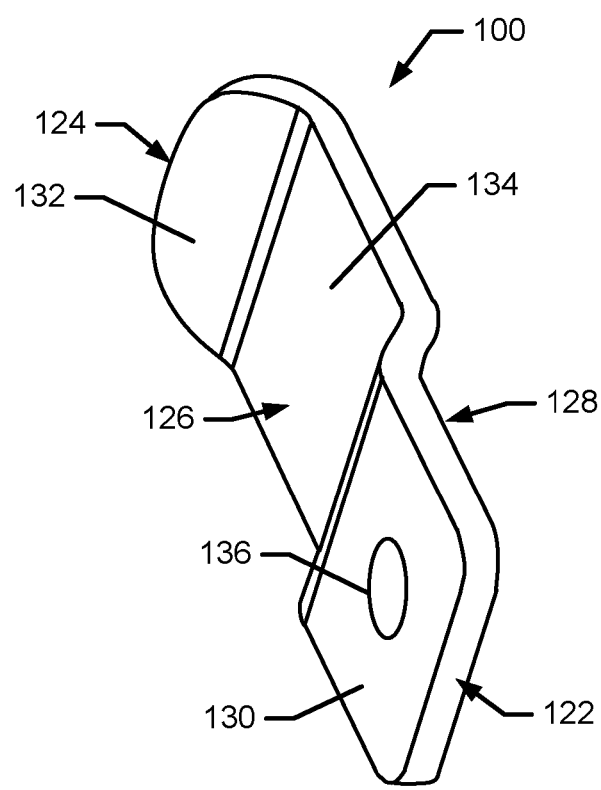
FIG. 3 displays a perspective view of the retaining clip of FIGS. 1 and 2.
Figure 4:
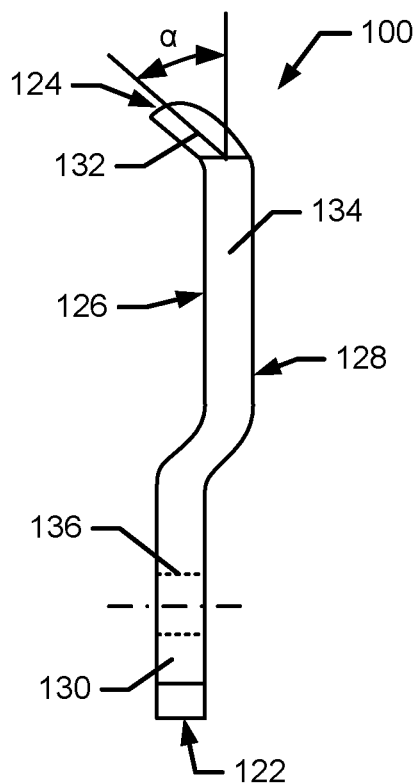
FIG. 4 displays a right side view of the retaining clip of FIGS. 1 and 2, the left side view of the retaining clip of FIGS. 1 and 2 being a mirror image of the right side view.
Figure 5:
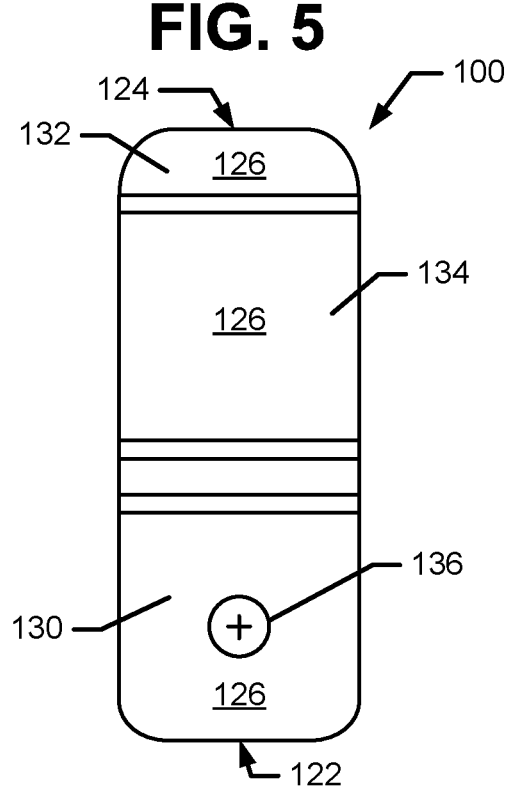
FIG. 5 displays a front view of the retaining clip of FIGS. 1 and 2.
Figure 6:
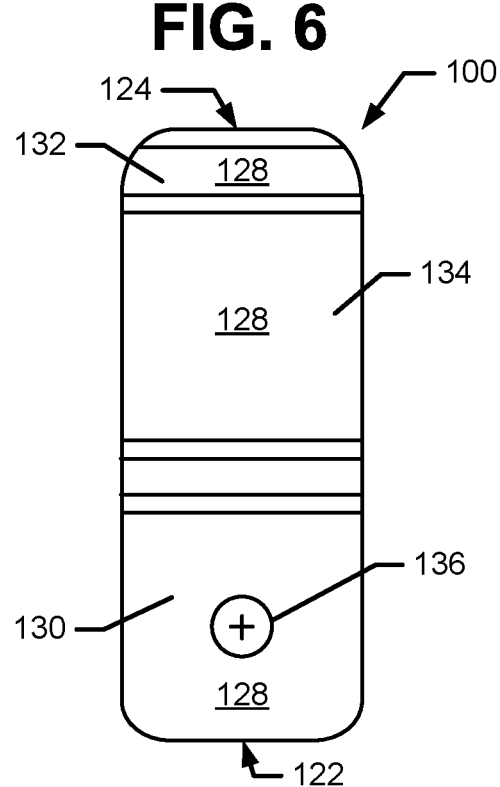
FIG. 6 displays a back view of the retaining clip of FIGS. 1 and 2.

As illustrated in FIGS. 1 and 2, multiple retaining clips 100 may be used to retain each of the lid 104 and base 106 of the cooking device 102 in position relative to respective bands 108, 110. The lid 104 includes a protruding rim 112 (or ridge 112) that extends about the lid 104 near a bottom edge 114 of the lid 104. Similarly, the base 106 includes a protruding rim 116 (or ridge 116) that extends about the base 106 near a top edge 118 of the base 106. Both rims 112, 116 have a similar shape or profile. As a consequence, each retaining clip 100 is similarly shaped or formed to conform to the shape or profile of rims 112, 116. However, the retaining clips 100A used to retain the position of the lid 104 relative to band 108 and the retaining clips 100B used to retain the position of the base 106 relative to band 110 are oriented in opposite vertical directions. More particularly, retaining clips 100A extend in an upward vertical direction from band 108, while retaining clips 100B extend in a downward vertical direction from band 110. According to the example embodiment described herein, the retaining clips 100A, 110B are secured to a respective band 108, 110 by respective fasteners 120A, 120B. In alternative embodiments, the retaining clips 100A, 100B may be secured to a respective band 108, 110 by welding, crimping or other connection method, the retaining clips 100A, 100B may interact with a respective band 108, 110 in a manner that limits or prevents movement between the retaining clips 100A, 100B and the respective band 108, 110, or the retaining clips 100A, 100B may be formed integrally with a respective band 108, 110 so that no connection of the retaining clips 100A, 100B to a respective band 108, 110 is necessary.

Each retaining clip 100, as illustrated in FIGS. 3-6, has a first end 122 and a second end 124 longitudinally disposed distant from the first end 122, and has a first surface 126 and an opposed second surface 128. Each retaining clip 100 comprises a band interface portion 130 extending from the retaining clip's first end 122 generally toward the second end 124, a hook portion 132 extending from the retaining clip's second end 124 generally toward the first end 122, and a rim interface portion 134 extending between and intermediate the hook portion 132 and band interface portion 130. In accordance with the example embodiment, each retaining clip 100 is manufactured from steel or aluminum having sufficient physical, structural, and/or strength properties appropriate for use as described herein. It should be understood and appreciated, however, that a retaining clip 100 may be manufactured from other acceptable materials in other example embodiments.

The band interface portion 130 is substantially planar and defines a hole 136 extending therethrough between the retaining clip's first and second surfaces 126, 128. The band interface portion 130 is configured for cooperation with a band 108, 110 such that, when the retaining clip 100 is secured to a band 108, 110, the first surface 126 is adjacent and in contact with a band 108, 110. The hole 136 is located relative to the retaining clip's first end 122 for collinear alignment with a corresponding hole defined in a band 108, 110. The hole 136 is sized similarly to a corresponding hole defined in a band 108, 110 for receiving a fastener 120 therethrough that secures the band interface portion 130 to a band 108, 110.

The rim interface portion 134 is also substantially planar, but the plane of the rim interface portion 134 is slightly offset relative to the plane of the band interface portion 130 to allow the retaining clip 100 to interface with and receive a protruding rim 112, 116 of the cooking device. Together, the rim interface portion 134 and band interface portion 130 are configured such that the portion of the first surface 126 of the retaining clip 100 in the area of the rim interface portion 134 is adjacent and in contact with a protruding rim 112, 116 of the lid 104 or base 106 of the cooking device 102 when the retaining clip 100 is in use.

The hook portion 132 and rim interface portion 134 of the retaining clip 100 define an angle, α, therebetween selected to substantially correspond and conform to the angle formed by the surface of the rim 112, 116 of a respective lid 104 or base 106. By virtue of such configuration, the portion of the first surface 126 of the retaining clip 100 in the area of the hook portion 132 is adjacent to and in contact with the surface of the rim 112, 116 when the retaining clip 100 is in use. Also, part of the rim 112, 116 is trapped between the retaining clip's hook portion 132 and band interface portion 130 by virtue of the rim interface portion 134 being offset relative to the band interface portion 130, thereby substantially limiting and restricting movement between the respective lid 104 or base 106 and the band 108, 110 to which the retaining clip 100 is secured.

In use according to a method of the example embodiment, a retaining clip 100 is positioned at a location about the centerline of the lid 104 or base 106 of a cooking device 100 with hole 136 in collinear alignment with a corresponding hole defined in a band 108, 110 respectively extending at least partially about the lid 104 or base 106. If positioned about the lid 104, the retaining clip's second end 124 is at a vertical elevation above that of the retaining clip's first end 122. Alternatively, if positioned about the base 106, the retaining clip's second end 124 is at a vertical elevation below that of the retaining clip's first end 122. The retaining clip 100 is also positioned with the band interface portion 130 (and a portion of first surface 126 in the area of the band interface portion 130) adjacent to and in contact with the band 108, 110. Additionally, in such position, the rim interface portion 134 receives and is in contact with part of a protruding rim 112, 116 of the lid 104 or base 106, as the case may be, of the cooking device 100. In addition, the hook portion 132 and, more particularly, the portion of the retaining clip's first surface 126 in the area of the hook portion 132 contacts and engages the surface of the rim 112, 116 and traps part of the rim 112, 116 between the clip's hook portion 132 and band interface portion 130. Once so positioned, a fastener 120 is inserted through hole 136 of the retaining clip 100 and through a corresponding collinearly-aligned hole defined in the band 108, 110 to secure the retaining clip 100 and the band interface portion 130 thereof to the band 108, 110.

According to the method, multiple retaining clips 100 may be similarly positioned at different locations about and secured to a band 108, 110 of the cooking device's lid 104 or base 106, as the case may be. After a retaining clip 100 is secured to a band 108, 110, engagement of the clip's hook portion 132 with the device's rim 112, 116 and trapping of part of the rim 112, 116 between the clip's hook portion 132 and band interface portion 130, limits and may prevent relative movement between the band 108, 110 and the cooking device's rim 112, 116 and, hence, also between the cooking device's lid 104 or base 106 and the band 108, 110, as the case may be. The installation and use of multiple retaining clips 100 provides similar limiting of movement at multiple locations around the cooking device's lid 104 or base 106.

Whereas the present invention has been described in detail above primarily with respect to an example embodiment thereof, it should be appreciated that variations and modifications might be effected within the spirit and scope of the present invention.

What is claimed is:

1. A retaining apparatus for a cooking device, wherein the cooking device comprises a lid and a base, the retaining apparatus comprising:
    a band coupled to and extending around the lid, wherein the lid, when closed, is configured to cover the base of the cooking device, and wherein the band is configured to move relative to the lid when the band is coupled to the lid; and
    a retaining clip that restricts the movement of the band relative to the lid, wherein the retaining clip comprises:
        a band interface portion configured to an outer surface of the band; and
        a rim interface portion extending from the band interface portion, the rim interface portion configured to receive and trap a part of a rim of the lid such that the rim interface portion is in contact with the rim, wherein the rim extends about the lid, and wherein the rim interface portion is located between the band interface portion and a hook portion;
    wherein the hook portion extends from the rim interface portion, wherein the hook portion is configured to contact another part of the rim of the lid of the cooking device; and
    wherein the band and the retaining clip remain coupled to the lid during opening of the lid from the base of the cooking device.

2. The retaining apparatus of claim 1, wherein the rim interface portion is intermediate the band interface portion and the hook portion.

3. The retaining apparatus of claim 1, wherein the rim interface portion is offset relative to the band interface portion.

4. The retaining apparatus of claim 1, wherein the hook portion defines an angle relative to the rim interface portion.

5. The retaining apparatus of claim 4, wherein the angle is selected to conform to the shape of the rim and limit movement of the rim relative to the band.

6. A retaining clip for a cooking device, wherein the cooking device comprises a lid and base, wherein the lid, when closed, is configured to cover the base of the cooking device, the retaining clip comprising:
    a band interface portion configured to connect to an outer portion of a band, wherein the band is coupled to and extending around the lid, wherein the band is configured to move relative to the lid when the band is coupled to the lid; and
    a rim interface portion extending from the band interface portion, wherein the rim interface is configured to receive and trap a part of a rim of the lid such that the rim interface portion is in contact with the rim, wherein the rim extends about the lid, and wherein the rim interface portion is located between the band interface portion and a hook portion, wherein the hook portion extends from the rim interface portion, wherein the hook is configured to contact another part of the rim of the lid of the cooking device, and wherein the band and the retaining clip remain coupled to the lid during opening of the lid from the base of the cooking device.

7. The retaining clip of claim 6, wherein the band interface portion is configured to connect to the band via a fastener.

8. The retaining clip of claim 6, wherein the band interface portion is configured to connect to the band via crimping.

9. The retaining clip of claim 6, wherein the band interface portion is configured to connect to the band via welding.

10. The retaining clip of claim 6, wherein the rim interface portion is offset relative to the band interface portion.

11. The retaining clip of claim 6, wherein the hook portion defines an angle relative to the rim interface portion.

12. The retaining clip of claim 11, wherein the angle is selected to conform to the shape of the rim and limit movement of the rim relative to the band.

13. The retaining apparatus of claim 1, wherein the band interface portion is configured to connect to the band via a fastener.

14. The retaining apparatus of claim 1, wherein the band interface portion configured to connect to the band via crimping.

15. The retaining apparatus of claim 1, wherein the band interface portion is configured to connect to the band via welding.

* * * * *